United States Patent [19]

Kloster

[11] Patent Number: 5,062,351

[45] Date of Patent: Nov. 5, 1991

[54] AIR DIFFUSER FOR A MOTOR VEHICLE

[75] Inventor: John M. Kloster, Caledonia, Ill.

[73] Assignee: Atwood Industries, Inc., Rockford, Ill.

[21] Appl. No.: 589,190

[22] Filed: Sep. 27, 1990

[51] Int. Cl.[5] .............................................. B60S 1/54
[52] U.S. Cl. ..................................................... 98/2.09
[58] Field of Search .................. 98/2.08, 2.09, 90, 91, 98/92

[56] References Cited

U.S. PATENT DOCUMENTS 4,522,114  6/1985  Matsund ............................... 98/2.09
4,604,946  8/1986  Watanabe ............................. 98/2.09
4,693,416  9/1987  Hayakawa ........................... 98/2.09

FOREIGN PATENT DOCUMENTS 174049  10/1983  Japan ................................... 98/2.09

Primary Examiner—Harold Joyce
Attorney, Agent, or Firm—Leydig, Voit & Mayer

[57] ABSTRACT

A defrost diffuser in the dash plate of a motor vehicle includes an inlet sleeve for receiving conditioned air and includes laterally spaced outlet slots for distributing the air upwardly toward and laterally across the windshield of the vehicle. A center outlet slot is in vertical registry with the inlet sleeve and is located between two outboard slots. Relatively large volume pods are spaced from opposite sides of the sleeve and communicate therewith by way of restricted channels. The pods define static regain chambers to reduce the velocity effect of the airflow toward the outboard outlet slots and to promote a more even distribution of the airflow from the center slot and the outboard slots. For economy of manufacture, the diffuser is made as an integral one-piece molded plastic unit.

7 Claims, 2 Drawing Sheets

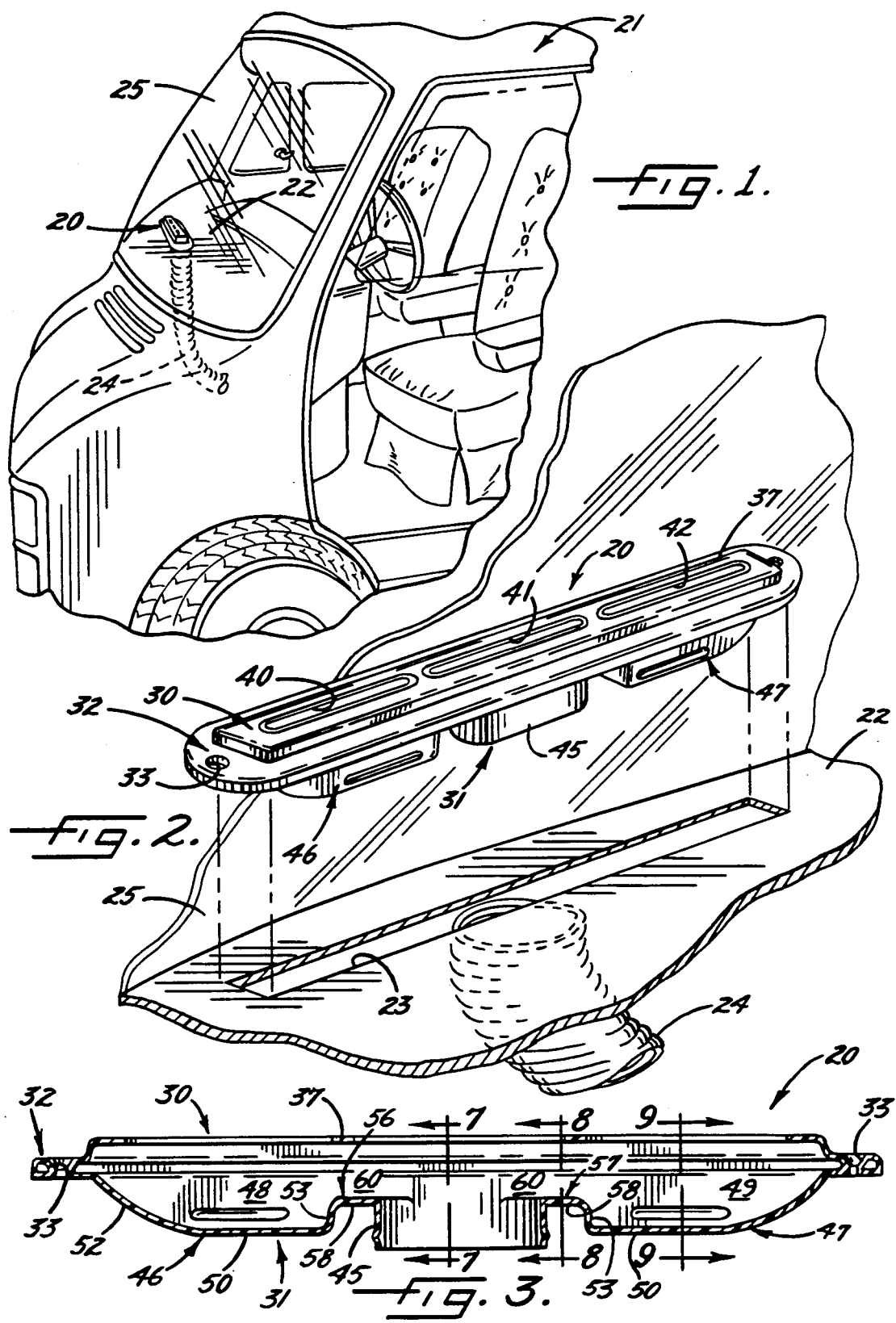

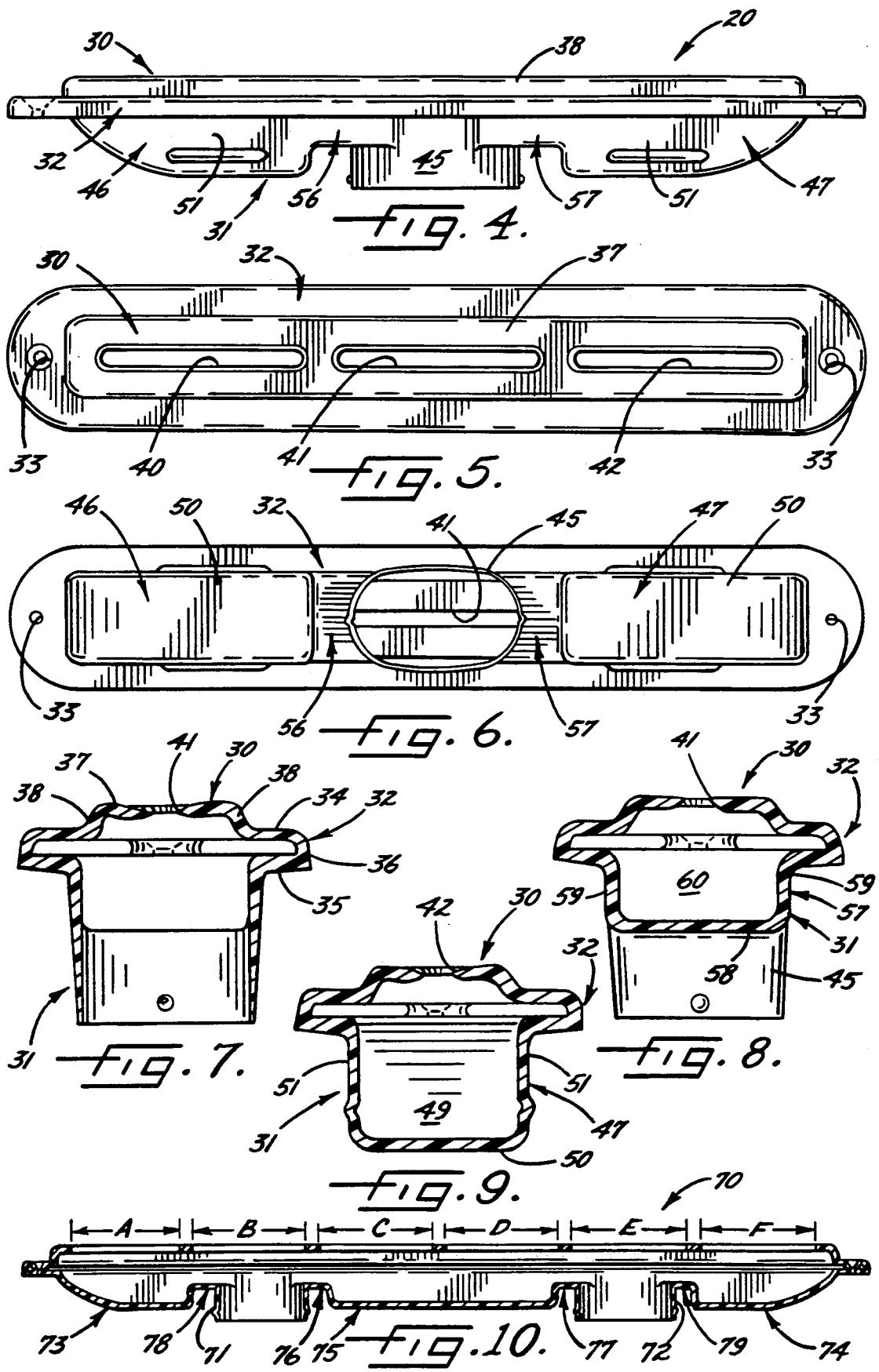

AIR DIFFUSER FOR A MOTOR VEHICLE

BACKGROUND OF THE INVENTION

This invention relates generally to an air diffuser and, more particularly, to a diffuser for use with the defroster system of a motor vehicle for distributing conditioned air upwardly toward and laterally across the windshield of the vehicle.

Presently available defroster diffusers comprise an elongated hollow body made of plastic and adapted to fit within a hole in the dash plate of the vehicle.

An inlet sleeve projects downwardly from the body and is adapted to be connected to a hose leading from the heater blower of the vehicle. Laterally spaced and laterally elongated outlet slots are formed through the upper side of the diffuser body and distribute air from the sleeve toward the windshield. Usually, one of the outlet slots is centered relative to the inlet sleeve while other slots are spaced from opposite ends of the center slot.

In conventional diffusers, the velocity effect of the airflow tends to produce a larger volume of flow through the outboard slots than through the center slot. As a result, the distribution of air across the windshield is uneven.

SUMMARY OF THE INVENTION

The general aim of the present invention is to provide a new and improved diffuser which, when compared with prior diffusers of the same general type, produces a more uniformly distributed airflow through the slots and across the windshield.

A more detailed object of the invention is to achieve the foregoing through the provision of a diffuser having unique pods which coact with restricted channels to define static regain chambers for reducing the velocity effect of the airflow and for evening out the flow of air from the multiple outlet slots.

The invention also resides in the comparatively economical one-piece plastic construction of the diffuser.

These and other objects and advantages of the invention will become more apparent from the following detailed description when taken in conjunction with the accompanying drawings.

BRIEF DESCRIPTION OF THE DRAWINGS

FIG. 1 is a fragmentary perspective view of a typical motor vehicle equipped with one embodiment of a new and improved diffuser incorporating the unique features of the present invention.

FIG. 2 is a perspective view showing the diffuser exploded from the dash plate of the vehicle.

FIG. 3 is an enlarged cross-section taken laterally through the diffuser shown in FIG. 2.

FIG. 4 is a front elevational view of the diffuser.

FIG. 5 is a top plan view thereof.

FIG. 6 is a bottom plan view thereof.

FIGS. 7, 8 and 9 are enlarged cross-sections taken substantially along the lines 7—7, 8—8 and 9—9, respectively, of FIG. 3.

FIG. 10 is a view similar to FIG. 3 but shows another embodiment of a diffuser incorporating the features of the invention.

DETAILED DESCRIPTION OF THE PREFERRED EMBODIMENTS

For purposes of illustration, the air diffuser 20 of the invention has been shown in the drawings in conjunction with a motor vehicle such as a van 21 having an upwardly facing dash plate 22. The diffuser is adapted to be inserted into a laterally elongated hole 23 (FIG. 2) in the dash plate and is adapted to be connected to a flexible hose 24 leading from the heater blower of the van. When the climate control system of the van is in a defrost mode, the diffuser distributes heated air upwardly toward and laterally across the windshield 25 of the van. For simplicity of illustration, a single diffuser 20 has been shown at the center portion of the dash plate 22. It will be appreciated that multiple diffusers could be spaced laterally across the dash plate and that the diffuser could be used with a side or rear window.

The present invention contemplates the provision of a diffuser 20 which, while being of extremely simple and economical construction, is capable of producing a substantially uniform airflow across its length. The diffuser is particularly characterized in that it reduces the velocity effect of the air flowing from the inlet hose 24 and causes the airflow at the end portions of the diffuser to be substantially the same as the airflow at the center portion of the diffuser.

More specifically, the diffuser 20 is molded of plastic and preferably is an integral one-piece unit. The present one-piece diffuser is blow molded although the diffuser could be formed by a rotational spin molding process.

The one-piece diffuser 20 includes a laterally elongated hollow body having an upper portion 30, a lower portion 31 and an intermediate mounting plate or flange 32 located between the upper and lower portions. The lower portion 31 of the diffuser 20 is adapted to fit within the hole 23 of the dash plate 22 while the flange 32 engages the upper side of the dash plate.

As shown most clearly in FIGS. 5 and 6, the mounting flange 32 is generally in the shape of a racetrack and includes laterally elongated sides and rounded ends. Holes 33 are formed through the end portions of the flange and are adapted to receive screws (not shown) for fastening the diffuser to the dash plate 22.

In this particular instance, the mounting flange 32 is hollow and is defined by a generally horizontal upper side 34 (FIG. 7), by a generally horizontal lower side 35 and by an upright web 36 which extends between the two sides around the outer peripheries thereof. In effect, the inner periphery of the flange defines an opening between the upper and lower portions 30 and 31 of the diffuser 20. That opening is closed off at its upper end by a cap which defines the upper portion 30 of the diffuser body. The cap includes a horizontal and a laterally elongated top plate 37 (FIGS. 3, 5 and 7) which is spaced above the upper side 34 of the mounting flange 32. Walls 38 (FIGS. 4 and 7) depend from the periphery of the top plate 37 of the cap 30 and are joined to the upper side of the flange.

In the embodiment of the invention shown in FIGS. 1 to 9, three laterally spaced and laterally elongated outlet slots 40, 41 and 42 (FIGS. 2 and 5) are formed vertically through the top plate 37 of the cap 30. The slot 41 is located between the slots 40 and 42 and thus is a center slot while the slots 40 and 42 are outboard slots. Air supplied to the diffuser 20 via the hose 24 is distributed upwardly against the windshield 25 by way of the slots.

The lower portion 31 of the diffuser 20 is formed with a central inlet sleeve 45 which is adapted to be connected to the supply hose 24. Herein, the sleeve is oval in shape and depends from the inner periphery of the lower side 35 of the flange 32 in centered relation with the center outlet slot 41. The long dimension of the slot 41 is somewhat greater than the long dimension of the inlet sleeve 45.

In carrying out the invention, the lower portion 31 of the diffuser body is formed with pods 46 and 47 disposed on laterally opposite sides of the inlet sleeve 45 and located in approximate vertical registry with the outboard outlet slots 40 and 42, respectively. The pods define static regain chambers 48 and 49 (FIG. 3), respectively, to prevent excess airflow from the outboard slots 40 and 42 and to enable the airflow from those slots to closely approximate that from the center slot 41.

As shown most clearly in FIGS. 3 and 4, the pods 46 and 47 are spaced in laterally opposite directions from the laterally facing sides of the inlet sleeve 45. Each pod is defined by a generally horizontal bottom wall 50 spaced a predetermined distance below the lower side 35 of the mounting flange 32 and a predetermined distance above the lower end of the sleeve 45. Laterally extending side walls 51 (FIGS. 4 and 9) extend vertically from the long margins of the bottom wall 50 to the lower side 35 of the mounting flange 32. At the outboard ends of the side walls 51, an outboard end wall 52 (FIG. 3) curves upwardly and gradually from the bottom wall 50 to the lower side 35 of the flange 32. At the opposite ends of the side walls 51, an inboard end wall 53 extends upwardly from the bottom wall 50 but terminates short of the lower side 35 of the flange 32. The total length of each pod 46, 47 is somewhat greater than the length of the respective slot 40, 42 while the width of the pods is somewhat greater than that of the overlying cap 30.

Further in keeping with the invention, the pods 46 and 47 communicate with the inlet sleeve 45 by way of channels 56 and 57 (FIGS. 3, 4, 6 and 8), respectively, having a depth and volume substantially less than the depth and volume of the pods. Air flowing into the pods through the restricted channels expands in the static regain chambers 48, 49 defined by the pods and thus the channels and pods coact to reduce the air velocity which otherwise would tend to produce a greater airflow through the outboard slots 40 and 42.

More specifically, each channel 56, 57 is defined by a generally horizontal lower wall 58 (FIGS. 3 and 8) spaced below the mounting flange 32 but spaced a substantial distance above the bottom wall 50 of the pod 46, 47. Each lower wall 58 extends laterally from the upper margin of the inboard end wall 53 of the respective pod and leads to the adjacent side of the sleeve 45 between the upper and lower ends thereof. Laterally extending side walls 59 (FIG. 8) extend upwardly from the lower wall 58 to the lower side 35 of the flange 32 to complete the channels 56, 57. Each channel thus defines a restricted passageway 60 between the sleeve and the respective pod.

With the foregoing arrangement, part of the air entering the inlet sleeve 45 flows directly out of the overlying center slot 41 while the remaining air splits in two laterally opposite directions for flow through the channels 56 and 57 to the pods 46 and 47, respectively. By virtue of the air being restricted upon flowing through the channels of relatively small depth and volume and then expanding into the pods of greater depth and volume, the inertial or velocity effect of the laterally flowing air is reduced so as to avoid a rush of air through the outboard slots 40 and 42. As a result, a more even distribution of air is produced through all three slots 40, 41 and 42 so as to effect more uniform clearing of the windshield.

A modified diffuser 70 is shown in FIG. 10 and is essentially the same as but is longer than the diffuser 20. The diffuser 70 includes two laterally spaced input sleeves 71 and 72, outboard pods 73 and 74 at the outboard sides of the sleeves, and a somewhat longer pod 75 between the sleeves and connected thereto by channels 76 and 77. The pod 73 is connected to the sleeve 71 by a channel 78 while the pod 74 is connected to the sleeve 72 by a channel 79. Outlet slots are in vertical registry with the sleeves 71 and 72 and the pods 73 and 74 the same as in the first embodiment while two additional outlet slots are in vertical registry with the pod 75. The various slots are indicated diagrammatically in FIG. 10 and are designated as A, B, C, D, E and F.

From the foregoing, it will be apparent that the present invention brings to the art a new and improved multi-slot diffuser which is capable of producing substantially uniform airflow through the various outlet slots. Because the diffuser is of a one-piece molded plastic construction, it requires no assembly of components and thus is relatively economical to produce.

I claim:

1. A diffuser for receiving conditioned air from supply hose means and for distributing such air upwardly toward and laterally across the windshield of a motor vehicle, said diffuser being molded of plastic and being formed with a laterally elongated hollow body having an upper portion and a lower portion, a laterally elongated and horizontally disposed mounting flange extending around the outer periphery of said body and having a lower side located between the upper and lower portions of the body, said upper portion of said body comprising a laterally elongated and horizontally disposed top plate, three laterally spaced and laterally elongated outlet slots formed vertically through said top plate, one of said slots being a center slot and the other two of said slots being first and second outboard slots spaced laterally from opposite ends of said center slot, the lower portion of said body comprising (A) a vertically extending inlet sleeve disposed in registry with said center slot and adapted for connection to said supply hose means, (B) first and second pods disposed in registry with said first and second outboard slots, respectively, and spaced laterally from said sleeve, each of said pods being defined by a bottom wall located a predetermined distance below said flange, by a pair of laterally extending side walls extending upwardly from said bottom wall to the lower side of said flange, by an outboard end wall extending upwardly from said bottom wall to the lower side of said flange at the outboard ends of said side walls, and by an inboard end wall extending upwardly from said bottom wall at the inboard ends of said side walls and terminating short of the lower side of said flange, and (C) first and second channels extending laterally between said sleeve and said first and second pods, respectively, to establish communication from said sleeve to said pods, the depth and volume of each channel being substantially less than the depth and volume of the respective pod whereby said pods define static regain chambers to promote substantially uniform distribution of air through the three slots.

2. A diffuser as defined in claim 1 in which said upper portion, said lower portion and said mounting flange are an integral one-piece unit.

3. A diffuser as defined in claim 2 in which said flange includes an upper side spaced vertically from said lower side, and a web extending between said sides around the outer periphery of said flange.

4. A diffuser as defined in claim 1 in which said top plate is spaced upwardly from said flange, and downwardly projecting walls extending from the periphery of said top plate and joined to said flange.

5. A diffuser as defined in claim 1 in which each of said channels is defined by a generally horizontal lower wall spaced above the bottom wall of the respective pod and extending laterally between the upper margin of the inboard end wall of such pod and the adjacent side of said sleeve, each of siad channels further being defined by a pair of laterally extending side walls extending upwardly from said lower wall to the lower side of said flange.

6. A diffuser as defined in claim 1 further including three additional laterally spaced and laterally elongated slots formed vertically through said top plate, said additional slots being spaced laterally along said plate from said first outboard slot, one of said additional slots being a middle slot and the other two of said additional slots being spaced laterally from opposite ends of said middle slots and being first and second additional outboard slots, said first additional outboard slot being in registry with said first pod, the lower portion of said body further comprising (D) an additional vertically extending inlet sleeve disposed in registry with said middle slot, spaced laterally from said first pod and adapted for connection to said supply hose means, (E) an additional pod disposed in registry with said second additional outboard slot and spaced laterally from said additional sleeve, said additional pod being defined by a bottom wall located a predetermined distance below said flange, by a pair of laterally extending side walls extending upwardly from said bottom wall to the lower side of said flange, by an outboard end wall extending upwardly from said bottom wall to the lower side of said flange at the outboard ends of said side walls, and by an inboard end wall extending upwardly from said bottom wall at the inboard ends of said side walls and terminating short of the lower side of said flange, (F) an additional channel extending laterally between said additional sleeve and said additional pod, and (G) a further channel extending laterally between said additional sleeve and said first pod, the depth and volume of said additional channel and said further channel being less than the depth and volume of said additional pod and said first pod, respectively.

7. A diffuser for receiving conditioned air from a supply hose and for distributing such air upwardly toward and laterally across the windshield of a motor vehicle having an upwardly facing dash plate with a laterally elongated and laterally extending hole formed vertically therethrough, said diffuser being of one-piece molded plastic construction and having a horizontal and a laterally elongated mounting plate adapted to engage the upper side of said dash plate around the margins of said hole and in overlying relation with said margins, said mounting plate having a laterally elongated and laterally extending opening formed vertically therethrough, a cap for covering said opening, said cap having a horizontal and a laterally elongated top plate spaced above said mounting plate and overlying said opening and having walls depending from the periphery of said top plate and joined to the upper side of the mounting plate, three laterally spaced and laterally elongated outlet slots formed vertically through the top plate of said cap, one of said slots being a center slot and the other two of said slots being first and second outboard slots located adjacent opposite ends of said center slot, a sleeve depending from said mounting plate in underlying relation with said center slot and communicating with said opening in said mounting plate, said sleeve being adapted to project downwardly into said hole in said dash plate and being adapted for connection to said supply hose, first and second hollow pods spaced laterally from opposite sides of said sleeve and depending from said mounting plate in underlying relation with said first and second outboard slots, respectively, each of said pods communicating with said opening in said mounting plate and being adapted to extend downwardly into said hole in said dash plate, each of said pods being defined by a generally horizontal bottom wall located a predetermined distance below said mounting plate, by a pair of laterally extending side walls extending upwardly from said bottom wall to the lower side of said mounting plate, by an outboard end wall extending upwardly from said bottom wall to the lower side of said mounting plate at the outboard ends of said side walls, and by an inboard end wall extending upwardly from said bottom wall at the inboard ends of said side walls and terminating short of the lower side of said mounting plate, and first and second hollow channels for establishing communication between said sleeve and said first and second pods, respectively, each channel extending laterally between said sleeve and the inboard end of the respective pod and depending from said mounting plate, each of said channels communicating with the opening in said mounting plate and extending downwardly into the hole in said dash plate, and each of said channels being defined by a generally horizontal lower wall spaced above the bottom wall of the respective pod and extending laterally between the upper margin of the inboard end wall of such pod and the adjacent side of said sleeve, each of said channels further being defined by a pair of laterally extending side walls extending upwardly from said lower wall to the lower side of said mounting plate.

* * * * *